(12) United States Patent
Gupte et al.

(10) Patent No.: US 10,467,567 B2
(45) Date of Patent: Nov. 5, 2019

(54) PROVIDING RESOURCES TO CUSTOMERS VIA NODE-RELATIONSHIP MODELS

(71) Applicant: HEWLETT PACKARD ENTERPRISE DEVELOPMENT LP, Houston, TX (US)

(72) Inventors: Prashant Gupte, Sunnyvale, CA (US); Matthew S. Newman, Sunnyvale, CA (US); Stephane H. Maes, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 643 days.

(21) Appl. No.: 14/914,078

(22) PCT Filed: Sep. 4, 2013

(86) PCT No.: PCT/US2013/058014
§ 371 (c)(1),
(2) Date: Feb. 24, 2016

(87) PCT Pub. No.: WO2015/034481
PCT Pub. Date: Mar. 12, 2015

(65) Prior Publication Data
US 2016/0217403 A1 Jul. 28, 2016

(51) Int. Cl.
*G06Q 10/06* (2012.01)
*G06F 16/28* (2019.01)
(Continued)

(52) U.S. Cl.
CPC ..... *G06Q 10/06313* (2013.01); *G06F 16/211* (2019.01); *G06F 16/288* (2019.01);
(Continued)

(58) Field of Classification Search
CPC ......... G06Q 10/00; G06Q 40/00; G06F 17/60
(Continued)

(56) References Cited

U.S. PATENT DOCUMENTS 7,221,945 B2 * 5/2007 Milford ..................... H04L 1/16
370/235
8,825,791 B2 * 9/2014 Morgan ................. G06F 9/5072
709/203

(Continued)

FOREIGN PATENT DOCUMENTS

CN 102541638 7/2012
CN 102640475 8/2012
(Continued)

OTHER PUBLICATIONS

Chapman, C. et al., Software Architecture Definition for On-demand Cloud Provisioning, Sep. 12, 2010, 21 pages, http://www.ee.ucl.ac.uk/~sclayman/docs/ClusterComp2011.pdf.
(Continued)

*Primary Examiner* — Romain Jeanty

(57) ABSTRACT

Providing resources to a customer can include providing a node-relationship model based on a realized service offering. The node relationship model can include an instantiated first resource provided by a resource provider; an instantiated second resource provided by the instantiated first resource; and a plurality of defined relationships among the resource provider, the instantiated first resource, and the instantiated second resource. Providing resources to a customer can include creating a deployment plan for a new service offering based on the node-relationship model.

18 Claims, 5 Drawing Sheets

(51) Int. Cl.
*H04L 12/24* (2006.01)
*G06F 16/21* (2019.01)

(52) U.S. Cl.
CPC ........ *H04L 41/044* (2013.01); *H04L 41/5051* (2013.01); *H04L 41/5054* (2013.01)

(58) Field of Classification Search
USPC ...................................................... 705/7.23
See application file for complete search history.

(56) References Cited

U.S. PATENT DOCUMENTS

| | | | |
|---|---|---|---|
| 8,863,138 B2 * | 10/2014 | Sedayao | G06F 11/30 709/223 |
| 8,914,469 B2 * | 12/2014 | Dawson | G06Q 10/10 705/80 |
| 8,918,490 B1 * | 12/2014 | Rattner | H04L 41/0816 709/223 |
| 9,336,059 B2 * | 5/2016 | Brown | G06F 9/5044 |
| 2002/0120744 A1 * | 8/2002 | Chellis | G06F 9/50 709/226 |
| 2005/0198244 A1 * | 9/2005 | Eilam | G06F 9/5061 709/223 |
| 2006/0271341 A1 * | 11/2006 | Brown | G06F 8/20 703/1 |
| 2009/0288084 A1 * | 11/2009 | Astete | G06F 9/45533 718/1 |
| 2010/0198730 A1 | 8/2010 | Ahmed et al. | |
| 2011/0029673 A1 | 2/2011 | Jaisinghani | |
| 2011/0137805 A1 | 6/2011 | Brookbanks et al. | |
| 2011/0231853 A1 | 9/2011 | Murray et al. | |
| 2011/0289479 A1 | 11/2011 | Pletter et al. | |
| 2012/0042311 A1 * | 2/2012 | Biran | G06F 9/45558 718/1 |
| 2012/0066687 A1 * | 3/2012 | Briscoe | H04L 41/0806 718/104 |
| 2012/0185913 A1 | 7/2012 | Martinez et al. | |
| 2012/0324092 A1 | 12/2012 | Brown et al. | |
| 2012/0331524 A1 | 12/2012 | Mower et al. | |
| 2013/0007272 A1 | 1/2013 | Breitgand et al. | |
| 2013/0036213 A1 | 2/2013 | Hasan et al. | |
| 2013/0060933 A1 | 3/2013 | Tung et al. | |
| 2013/0066945 A1 | 3/2013 | Das et al. | |
| 2013/0179390 A1 | 7/2013 | Arnold et al. | |
| 2013/0247034 A1 * | 9/2013 | Messerli | G06F 9/45533 718/1 |
| 2014/0101299 A1 * | 4/2014 | Cherel | G06F 9/468 709/223 |
| 2014/0137182 A1 * | 5/2014 | Elzur | H04L 63/20 726/1 |

FOREIGN PATENT DOCUMENTS

| | | |
|---|---|---|
| CN | 102835068 | 12/2012 |
| WO | WO2014007810 | 1/2010 |
| WO | WO2014088544 | 6/2014 |
| WO | WO2015034481 | 3/2015 |
| WO | WO2015034484 | 3/2015 |
| WO | WO2015034485 | 3/2015 |
| WO | WO2015034487 | 3/2015 |

OTHER PUBLICATIONS

Cisco Systems, Inc., Glue Networks Deployment Guide for the Cisco Next-generation WAN, May 1, 2013, 29 pages, http://www.cisco.com/en/US/docs/solutions/Enterprise/WAN_and_MAN/GlueNtwksDepGuide.pdf.
International Search Report and Written Opinion, PCT Patent Application No. PCT/US2013/058014, dated Jun. 11, 2014, 14 pages.
Mietzner, R. et al., Towards Provisioning the Cloud: On the Usage of Multi-Granularity Flows and Services to Realize a Unified Provisioning Infrastructure for SaaS Applications, IEEE Congress on Services 2008, Jul. 6-11, 2008, 8 pages.
Tsai, W-T et al., Service-oriented Cloud Computing Architecture, 2010 7th International Conference on Information Technology, Apr. 12-14, 2010, 10 pages.
VMware, Inc., VMware vCloud® Architecture Toolkit Operating a VMware vCloud, Oct. 2011, 92 pages http://www.vmware.com/files/pdf/vcat/Operating-VMware-vCloud.pdf.
European Patent Office, Extended European Search Report for Appl. No. 13892928.6 dated Apr. 4, 2017 (7 pages).

* cited by examiner

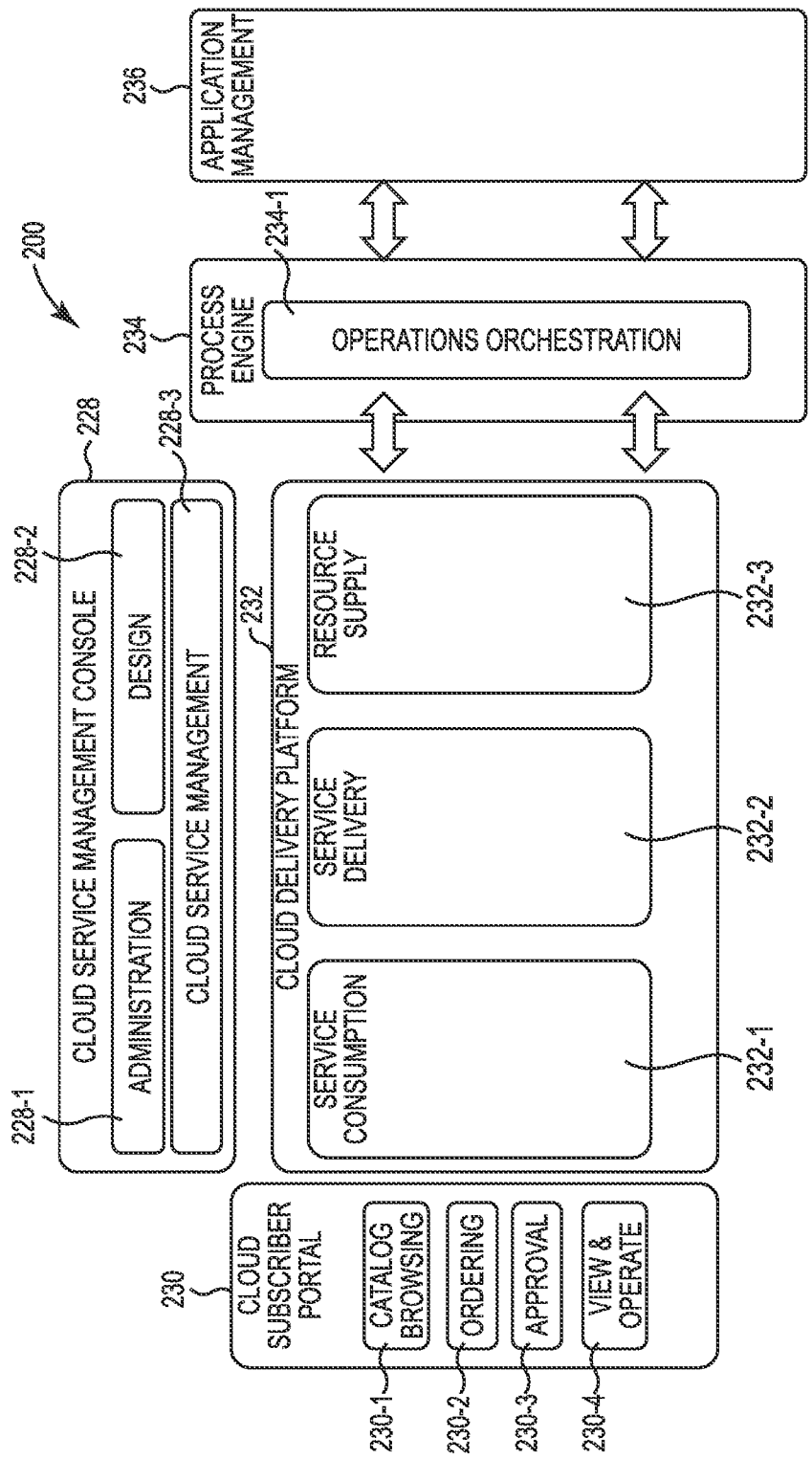

PROVIDING RESOURCES TO CUSTOMERS VIA NODE-RELATIONSHIP MODELS

CROSS-REFERENCE TO RELATED APPLICATION

This application is a U.S. National Stage Application of and claims priority to International Patent Application No. PCT/US2013/058014, filed on Sep. 4, 2013, and entitled "PROVIDING RESOURCES TO CUSTOMERS VIA NODE-RELATIONSHIP MODELS".

BACKGROUND

A cloud service generally refers to a service that allows end recipient computer systems to access a pool of hosted computing and/or storage resources over a network. A cloud service may provide Software as a Service (SaaS), Infrastructure as a Service (IaaS), and/or Platform as a Service (PaaS), among other services. A cloud service may offer public services and/or private services as requested by a customer.

BRIEF DESCRIPTION OF THE DRAWINGS

FIG. 2 is a flow diagram of an example of an environment for providing resources to customers according to the present disclosure.

DETAILED DESCRIPTION

Figure 1A:
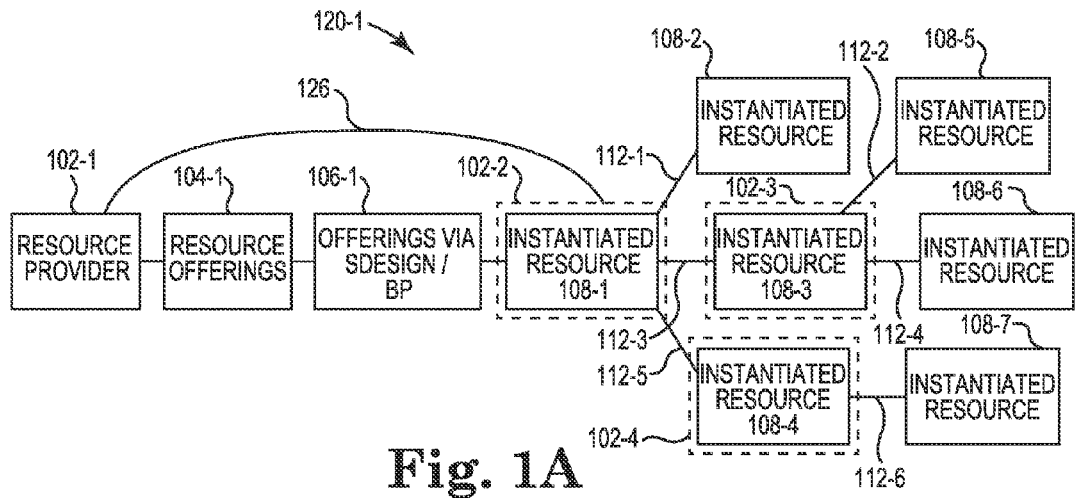
FIG. 1A illustrates an environment for providing resources to a first customer according to the present disclosure.

In a number of examples, a first customer can request a first number of resources. A resource provider can instantiate the resources and provide the first customer with instantiated first resources. The first customer can subsequently request a second number of resources. The second number of resources can be provided by the instantiated first resources that function as a different resource provider to conserve resources. The instantiated first resources can be divided, e.g., partitioned, to conserve resources rather than allocating a different number of resources for the instantiated second number of resources. As such, the instantiated first number of resources and the instantiated second number of resources can share resources while being independent and isolated from each other.

A node-relationship model can define a topology existing between the resource providers and/or the instantiated resources. The topology can be defined as a graph that includes relationships existing between the resource providers and/or the instantiated resources that can denote dependencies between the resource providers and/or the instantiated resources. The topology can include types (e.g., database, server) of resource providers and/or instantiated resources and relationships between the resource providers and/or instantiated resources.

For example, the relationships between the resource providers and/or the instantiated resources can include a location of the resource providers and/or instantiated resources and/or dependencies between the resource providers and/or instantiated resources. For example, the resource providers and/or instantiated resources may be located in different geographical locations based on constraints (e.g., a Quality of Service (QoS) of disaster recovery) provided by the first customer. Alternatively, instantiated resources may possess particular dependencies based on constraints provided by the first customer. For example, a first instantiated resource may be a virtual machine that can depend on (e.g., use) a database. As such, the node-relationship model can be specific to the first customer. However, an additional customer may specify constraints that are similar to or are the same as the constraints specified by the first customer.

As such, where the constraints specified by the additional customer are similar to and/or are the same as the constraints specified by first customer, the node-relationship model associated with the constraints specified by the first customer can be used to create a deployment plan for a new service offering for the additional customer. The deployment plan can be defined as instructions that can be executable by an engine to provision resources (e.g., resource providers, instantiated resources) and/or perform other lifecycle management functions, which can include creating instantiated resources, retiring instantiated resources, creating more instantiated resources, and/or creating less instantiated resources.

In some examples, the deployment plan for the new service offering can be based on a similarity of a desired service of the additional customer to a realized service offering associated with the first customer. For example, when the node-relationship model is used to create the deployment plan for the new service offering, the existing instantiated resources associated with the first customer can be managed to provide the new service offering. Alternatively, when the constraints specified by the additional customer are different than the constraints specified by first customer, new resources can be instantiated to fulfill the constraints specified by the additional customer.

Examples of the present disclosure can provide a node-relationship model based on a realized service offering. The node-relationship model can include an instantiated first resource provided by a resource provider, an instantiated second resource provided by the instantiated first resource, and a plurality of defined relationships among the resource provider, the instantiated first resource, and the instantiated second resource. Examples of the present disclosure can create a deployment plan for a new service offering based on the node-relationship model.

As used herein, a customer can be a user and/or an application through which the user makes a number of requests. An application refers to computer-readable instructions, e.g., software, firmware, etc., that can be run on a hardware processor, memory, etc., to process a number of requests and forward the requests through a network to a resource provider. In a number of examples, an application can be an end user application and/or an application that manages a number of resources. A resource can be a physical resource and/or a logical resource. For example, a resource can include Software as a Service (SaaS), Infrastructure as a Service (IaaS), and/or Platform as a Service (PaaS).

FIG. 1A illustrates an environment for providing resources to a first customer according to the present disclosure. The environment includes a first node relationship model 120-1. As discussed herein, the first node-relationship model 120-1 can define a topology existing between the resource providers 102-1, 102-2, 102-3, 102-4 and/or the instantiated resources 108-1, 108-2, 108-3, 108-4, 108-5, 108-6, 108-7. The environment includes resource providers 102-1, 102-2, 102-3, 102-4. The resource providers 102-1, 102-2, 102-3, 102-4 can be physical providers and/or a logical provider that create, organize, or reserve an instantiated resource for a customer's, e.g., an application's, use.

The environment includes a resource offering 104-1. The resource offering 104-1 is a capability that is associated with an instantiated first resource 108-1. The environment includes a service design 106-1. The service design 106-1 is a topology that allows a customer access to the instantiated first resource 108-1. As used herein, the service design 106-1 can be generally referred to herein as a blue print. The environment includes instantiated resources (e.g., hardware and/or logical resources) 108-1, 108-2, 108-3, 108-4, 108-5, 108-6, 108-7. The environment can include relationships 112-1, 112-2, 112-3, 112-4, 112-5, 112-6. The relationships can be defined as a location and/or dependency associated with the instantiated resources.

A customer can request a first number of resources from a resource provider 102-1. The resource provider 102-1 can be a physical provider and/or a logical provider that creates, organizes, or reserves an instantiated resource for a customers, e.g., an application's, use. For example, a resource provider 102-1 can be an access layer switch that is capable of configuring specific ports to allow network traffic to traverse the specific ports. The access layer switch can be the resource provider and the configuration of the specific ports, e.g. closing and/or opening the ports, can be the resource that the access layer provides. Other examples of resource provider and resource pairs can include a virtual center that instantiates virtual machines (VM) and/or a storage automation tool that creates storage containers.

The resource provider 102-1 can be offered as a resource offering 104-1 when the resource provider 102-1 is available. A user can request a service and execution of the service can involve calling an available resource provider 102-1 as described in the service design 106-1. The selection of the service provider 102-1 can be made at run time based on the type of resource offering 104-1. Resource offerings 104-1 are capabilities that are associated with an instantiated first resource 108-1. Capabilities can include creating and/or modifying the instantiated first resource 108-1. Capabilities can include starting and/or stopping the instantiated first resource 108-1, among other capabilities. As used herein, the term capabilities is intended to be inclusive. Capabilities are specific to the instantiated first resource 108-1. For example, if an instantiated first resource 108-1 is a database, then capabilities can include creating a database, populating the database, modifying the database, and/or restructuring the database, among other capabilities associated with a database.

The service design 106-1 can be designed using the resource provider 102-1 that is in the resource offering 104-1. The service design 106-1 is a topology that allows the customer access to the instantiated first resource 108-1, The service design 106-1 can further specify a location of each instantiated resource in the topology.

As discussed herein, it may be desirable to locate a first type of instantiated resource at various locations and a second type of instantiated resource at various locations to provide redundancy of systems. Alternatively, different types of instantiated resources may be located in a same location (e.g., data center). In some examples, particular constraints (e.g., QoS parameter, business policy parameter, data center constraints, and SLA parameter) can be associated with particular topologies of the instantiated resources. For example, a QoS disaster recovery parameter may be associated with a topology that includes multiple instantiated resources in multiple geographic locations (e.g., United States, Europe).

An instantiated first resource 108-1 and instantiated resources 108-2, 108-3, . . . , 108-7 can be instantiations of the requested resource. A resource or requested resource is a resource that has not been instantiated. For example, a requested resource can be a server while the instantiated resource can be an instantiation of the server.

An instantiated resource can be a resource that has been instantiated based on the blue print 106. The instantiated first resource 108-1 can be created based on a number of specifications that are provided with the request for resources made by the application. Examples of the instantiated first resource 108-1 can include an operating system, a server, and/or a network connection, among other examples of the instantiated first resource 108-1. In a number of examples, an instantiated first resource 108-1 can perform a number of logical and/or hardware functions. The instantiated first resource 108-1 can consume a number of other instantiated resources, e.g., hardware and/or logical resources. For example, an instantiated first resource 108-1 that is a server can consume a number of memory resources to provide a number of functions.

In previous approaches, a number of different instantiated resources (e.g., instantiated resources upon which instantiated resource 108-1 depends), are wholly consumed (e.g., used) by instantiated first resource 108-1 and not wholly and/or partially consumed by instantiated first resource 108-1. For example, an application can request a first server and the resource provider 102-1 can create an instantiated first resource 108-1 that is a first server that consumes a first memory, a first number of network connections, and a first operating system, among other instantiated resources. The application can request a second server and the resource provider 102-1 can create a different instantiated resource that is a second server. The second server can consume a second memory, a second number of network connections, and a second operating system. That is, in previous approaches, a new set of instantiated resources, e.g., a memory, a number of network connections, and an operating system, are reserved for a server each time a server is instantiated. As such, a different number of instantiated resources can be reserved for the second instantiated resource even though an initial number of instantiated resources that are reserved for the instantiated first resource 108-1 remain underutilized. However, in a number of examples, an instantiated second resource 108-2 can share the initial number of instantiated resources with the first instantiated resource 108-1, along with an instantiated third resource 108-3 and instantiated fourth resource 108-4, etc.

Additionally, in previous approaches, whole instantiated resources can be provided to a first customer based on their needs. However, the first customer's needs may not utilize the whole resource in its entirety, thereby creating inefficiencies associated with unused resources. Further, additional customers may have needs that are the same and/or similar to the first customer and may be provided whole instantiated resources that are not utilized in their entirety. As such, multiple sets of the same instantiated resources may exist that are not used in their entirety.

In some examples, the realized service offering associated with the node relationship model 120-1 can be provided when a request is received from a first customer for a first resource at the resource provider 102-1. The resource provider 102-1 can provide a first reference of the instantiated first resource 108-1 to the customer. A first reference can include a reference to the instantiated first resource 108-1. A reference can be a link, a pointer, an address, and/or any other means by which the customer and/or the application can communicate with the instantiated first resource 108-1. A request from the first customer can be received for a second resource at the instantiated first resource 108-1 and the instantiated first resource can provide a second reference of the instantiated second resource 108-2 to the first customer.

In a number of examples, resource provider 102-1 can create an instantiated first resource 108-1 as described above. The instantiated first resource 108-1 can use a number of instantiated resources to provide a number of functions to an application that requested the instantiated first resource 108-1. In a number of examples, the instantiated first resource 108-1 can be partitioned to create the instantiated first resource 108-1 and an instantiated resource 108-2, 108-3, 108-4. That is, the number of instantiated resources that an instantiated first resource 108-1 uses can be partitioned such that a first portion of the number of instantiated resources are used by the instantiated first resource 108-1; second portion of the number of instantiated resources are used by the instantiated second resource 108-2; third portion of the number of instantiated resources are used by the instantiated third resource 108-3; and fourth portion of the number of instantiated resources are used by the instantiated fourth resource 108-4.

For example, instantiated resource 108-1 can be a database. The database can be partitioned such that instantiated resources 108-2, 108-3, . . . , 108-4 can be a schema supported by the database, e.g., instantiated resource 108-1. As such, the instantiated resources that the database, e.g., instantiated first resource 108-1, uses can be partitioned and divided between instantiated first resource 108-1 and instantiated resources 108-2, 108-3, 108-4 to provide isolated customer access to the database and/or the schemas associated with the database. That is, the instantiated resources 108-2, 108-3, . . . , 108-4 can be a partition of the database without requiring new instantiated resources to be allocated to support a different database for the instantiated resources 108-2, 108-3, 108-4. Using a single database to provide instantiated first resource 108-1 and instantiated resources 108-2, 108-3, 108-4 can conserve resources versus creating two different databases particularly if the two different databases are underutilized.

The instantiated resources 108-1, 108-2, 108-3, 108-4 can be partitioned by a resource provider 102-2. The instantiated first resource 108-1 can be and/or act as a resource provider 102-2. In a number of examples, the instantiated first resource 108-1 can be independent of resource provider 102-2 and/or the instantiated first resource 108-1 can be included in the resource provider 102-2.

Creating the resource provider 102-2 can include registering 126 the resource provider 102-2 with the resource provider 102-1. In a number of examples, creating the resource provider 102-2 can include registering 126 the resource provider 102-2 with an application that requested the instantiated first resource 108-1 and/or the instantiated resources 108-2, 108-3, 108-4.

Registering 126 the resource provider 102-2 with the resource provider 102-1 can include registering the capabilities and/or functions associated with the instantiated first resource 108-1 and/or the instantiated resources 108-2, 108-3, 108-4. Registering 126 the resource provider 102-2 can include registering a type of the resource provider 102-2 or a type of the instantiated first resource 108-1 and the instantiated resources 108-2, 108-3, 108-4. For example, a type can be a database type, a server type, a network connection type, and/or other descriptions of instantiated resources. Registering 126 can further include registering a number of parameters that further describe the instantiated first resource 108-1 and the instantiated resources 108-2, 108-3, 108-4. For example, a parameter can be a structural query language (SQL) among other parameters that describe the resource provider 102-2 and/or the instantiated first resource 108-1, e.g., a database.

Registering 126 the resource provider 102-2 can also include registering a number of commands, lifecycle management actions, etc. that are associated with the instantiated first resource 108-1 and/or the instantiated resource 108-2, 108-3, 108-4. Commands associated with the instantiated resources 108-1, 108-2, . . . , 108-4 can be commands that are used by an application to communicate with the instantiated resources 108-1, 108-2, . . . , 108-4.

In examples of the present disclosure, registering 126 the resource provider 102-2 can include creating instantiated resources 108-2, 108-3, 108-4 and registering the instantiated resources that are being used and creating the resource provider 102-2 for the available instantiated resources. New services can be created using the service provider 102-2 for the available instantiated resources. Alternatively, additional instantiated resources can be created if no instantiated resources are available. As such, a registry associated with the service provider 102-2 can be updated to reflect what instantiated resources are being used. The resource provider can then manage lifecycles of the services that may impact the used instantiated resources (e.g., create, retire, create more and/or less instantiated resources).

In a manner analogous to how instantiated first resource 108-1 is partitioned to create instantiated resources 108-2, 108-3, 108-4, the instantiated resources 108-3, 108-4 can be partitioned to create the instantiated resources 108-5 and 108-6 and 108-7, respectively. The instantiated resources 108-3, 108-4, . . . , 108-7 can be partitioned by resource providers 102-3, 102-4, respectively.

The resource providers 102-3, 102-4 can be registered, in a manner analogous to how resource provider 102-2 is registered. For example, creating the resource providers 102-3, 102-4 can include registering the resource providers 102-3, 102-4 with the resource provider 102-2 and/or the resource provider 102-1.

The instantiated resources 108-1, 108-2, . . . , 108-7, resource providers 102-1, 102-2, 102-3, resource offerings 104-1, and/or service design 106-1 can be related to one another by a plurality of defined relationships 112-1, 112-2, 112-6, hereinafter generally referred to as plurality of defined relationships 112. The plurality of defined relationships 112 can include dependencies. In some examples, the plurality of defined relationships 112 can include a use-of dependency (e.g., 112-1). For example, the plurality of defined relationships 112 can include a use-of dependency from the instantiated second resource 108-2 to the instantiated first resource 108-1.

In some examples, a use-of dependency can include a scenario where the instantiated second resource 108-2 depends on the instantiated first resource 108-1, or vice versa. For example, where the instantiated first resource 108-1 is a virtual machine and the instantiated second resource 108-2 is a database, the virtual machine can use the database and/or the database can use the virtual machine.

The plurality of defined relationships 112 can include a part-of dependency. In some examples, a part-of dependency (e.g., 112-1) can include a scenario where the instantiated second resource 108-2 is part of and/or hosted on the instantiated first resource 108-1. For example, where the instantiated first resource 108-1 is a server and the instantiated second resource 108-2 is a virtual machine, the virtual machine can be hosted on the server. As such, the virtual machine can be part-of the server.

In some examples, the plurality of defined relationships 112 can include physical relationships between the instantiated resources (e.g., 108-1, 108-2) and/or the resource providers 102. The physical relationships can include a location of one of the instantiated resources (e.g., instantiated resources 108-1) in relation to another of the instantiated resources (e.g., instantiated resources 108-2). In some examples, where the instantiated first resource 108-1 is an application server and the instantiated second resource 108-2 is a database, a customer profile may specify where the application server and the database should be located. For example, the customer profile may specify the plurality of defined relationships 112 and/or constraints that can be used to determine the plurality of defined relationships 112.

In some examples, the customer profile can include example constraints such as a quality of service (QoS) parameter, business policy parameter, data center constraints parameter, and service level agreement (SLA) parameter, although examples are not so limited. Based on the constraints, particular resources can be selected and/or the plurality of defined relationships 112 can be created that fulfill the constraints included in the customer profile. In some examples, a QoS of disaster recovery may be interpreted to specify that resources such as the application server and the database should be hosted in different data centers to avoid both the application server and the database being affected as a result of a disaster. In some examples, the QoS of disaster recovery may be interpreted to specify that multiple application servers and multiple databases should be hosted in different data centers to avoid all of the application servers and/or all of the databases being affected as a result of a disaster.

In some examples, an SLA can specify a particular level of service that a customer may be provided. Levels of service can include hosting resources in a tier 1 data center, a tier 2 data center, and/or a tier 3 data center, in some examples. Based on the level of service specified in the SLA, particular resources can be selected that are hosted in a data center associated with a particular tier and/or the plurality of defined relationships 112 can be created between particular resources that are in data centers associated with a particular tier.

In a number of examples, a realized service offering associated with the node relationship model 120-1 can be constructed based on the customer profile. The particular resources can be selected and the plurality of defined relationships 112 can be created between the particular resources so that constraints included in the customer profile can be met. For example, the particular resources can be selected and the plurality of defined relationships 112 can be created between the particular resources so that a particular QoS parameter, business policy parameter, data center constraints parameter, and/or SLA parameter is met.

A node-relationship model 120-1 can be provided that is a model based on the associated realized service offering. The node-relationship model 120-1 can include nodes, which can be defined as resource providers 102-1, 102-2, 102-3, 102-4, resource offerings 104-1, service design 106-1, instantiated resources 108-1, 108-2, . . . , 108-7, and relationships, 112-1, 112-2, . . . , 112-6. In some examples, the realized service offering associated with the node relationship model 120-1 can be created for a customer based on their customer profile. The realized service offering can then be modeled to provide the node-relationship model 120-1.

The node-relationship model 120-1 can be a model that includes an instantiated first resource 108-1 provided by the resource provider 102-1 and an instantiated second resource 108-2 provided by the instantiated first resource 108-1 (e.g., resource provider 102-2). In addition, the node-relationship model 120-1 can include a plurality of defined relationships among the resource provider 102-1, the instantiated first resource 108-1, and the instantiated second resource 108-2. For example, the node-relationship model can include defined relationship 112-1 between the instantiated first resource 108-1 and the instantiated second resource 108-2.

Figure 1B:
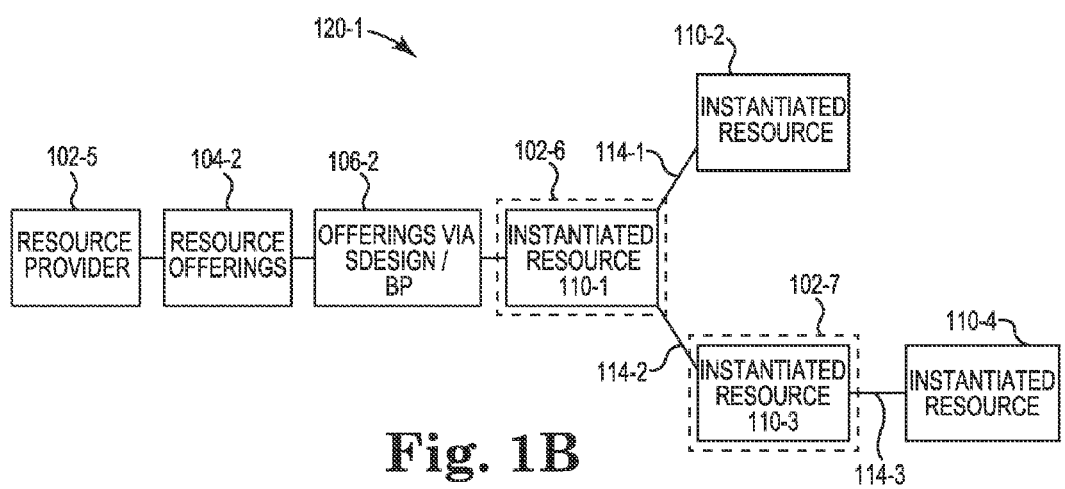
FIG. 1B illustrates an environment for providing resources to a second customer according to the present disclosure.

FIG. 1B illustrates an environment for providing resources to a second customer according to the present disclosure. The environment includes features as discussed in relation to FIG. 1A. The environment includes a second node relationship model 120-2. As discussed herein, the second node-relationship model 120-2 can define a topology existing between the resource providers 102-5, 102-6, 102-7 and/or the instantiated resources 110-1, 110-2, 110-3, 110-4. The environment includes resource providers 102-5, 102-6, 102-7. The resource providers 102-5, 102-6, 102-7 can be physical providers and/or a logical provider that create, organize, or reserve an instantiated resource for a customer's, e.g., an application's, use.

The environment includes a resource offering 104-2. The resource offering 104-2 is a capability that is associated with an instantiated first resource 110-1. The environment includes a service design 106-2. The service design 106-2 is a topology that allows a customer access to the instantiated first resource 110-1. The environment includes instantiated resources (e.g., hardware and/or logical resources) 110-1, 110-2, 110-3, 110-4. The environment can include relationships 114-1, 114-2, 114-3. The relationships can be defined as a location and/or dependency associated with the instantiated resources.

In some examples, a plurality of node-relationship models can be created for different realized service offerings. For example, the node-relationship model 120-1 can be created for a realized service offering for a customer and an additional node-relationship model 120-2 can be created for an additional realized service offering for a first customer. The node-relationship model 120-1 can be created for the customer and can be associated with a particular QoA parameter and a particular SLA parameter desired by the customer while the additional node-relationship model 120-2 can be created for the first customer and can be associated with a data center parameter and a particular QoA parameter. As such, each node-relationship model (e.g., 120-1, 120-2) can be associated with a realized service offering that provides for the particular constraints specified by an associated customer. As discussed herein, the realized service offering associated with the node relationship model 120-2 can include resource providers 102-5, 102-6, 102-7, resource offerings 104-2, service design 106-2, instantiated resources 110-1, 110-2, 110-3, 110-4, and a plurality of defined relationships 114-1, 114-2, 114-3. In some examples, a plurality of node-relationship models (e.g., 120-1, 120-2) can be created and/or stored.

Figure 1C:
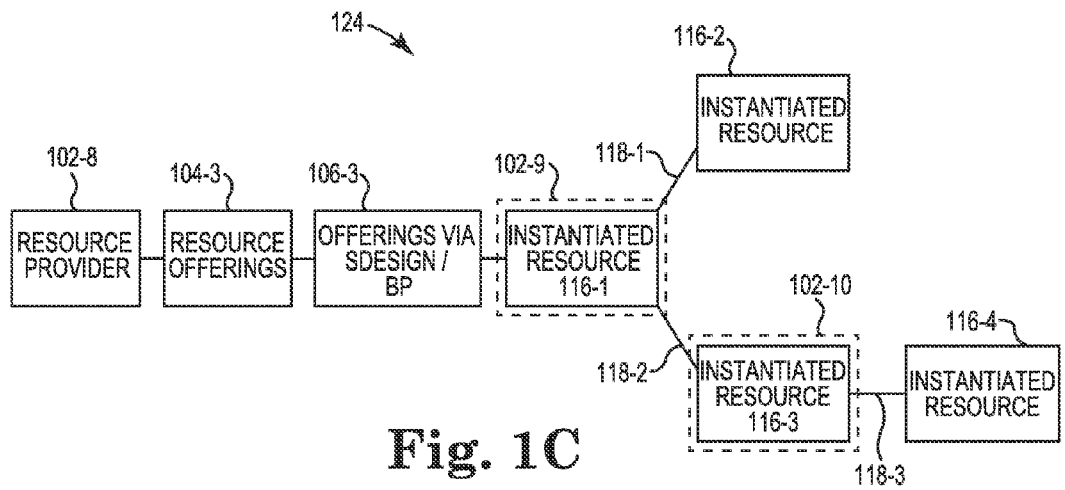
FIG. 1C illustrates an environment for creating a deployment plan for a new service offering according to the present disclosure.

FIG. 1C illustrates an environment for creating a deployment plan for a new service offering according to the present disclosure. The node-relationship models 120-1, 120-2 can be used to create a deployment plan for a new service offering based on one of the node-relationship models 120-1, 120-2. In some examples, a second customer can specify constraints such as a particular QoS parameter, business policy parameter, data center constraints parameter, and/or SLA parameter for a desired service in a customer profile. A similarity of the desired service of the customer can be compared to the service associated with the node-relationship model 120-1 and node-relationship model 120-2 to determine a type of deployment plan to create. Based on the comparison, a deployment plan 124 associated with a new service offering for the second customer can be created based on the node relationship model (e.g., 120-2). For example, a determination can be made that the desired service of the second customer (e.g., constraints specified by the second customer) is most similar to the service offered to the first customer (e.g., constraints specified by the first customer) by the node-relationship model 120-2 associated with the realized service offering. As such, the deployment plan 124 can be created based on the node relationship model 120-2.

In some examples of the present disclosure, the node relationship model can include a plurality of instantiated first resources provided by a plurality of resource providers. For example, in order to provide a desired service to a customer, more than one resource provider may be used. Some examples can include a plurality of instantiated second resources that can be provided by the plurality of instantiated first resources. Accordingly, the node-relationship model can include a plurality of defined relationships among the plurality of resource providers, the plurality of instantiated first resources, and the plurality of instantiated second resources.

The realized service offering associated with the node relationship model 120-1, realized service offering associated with the node relationship model 120-2, and the new service offering associated with the deployment plan 124 can include cloud service offerings. In some examples, a cloud service can refer to a service that allows end recipient computer systems (e.g., thin clients, portable computers, smartphones, desktop computers and so forth) to access a pool of hosted computing and/or storage resources (e.g., cloud resources) and networks over a network (e.g., the Internet). In this manner, the host, a cloud service provider, may, as examples, provide Software as a Service (SaaS) by hosting applications; Infrastructure as Service (IaaS) by hosting equipment (e.g., servers, storage components, network components, etc.); or a Platform as a Service (PaaS) by hosting a computing platform (e.g., operating system, middleware, data bases, autoscaling infrastructure, etc.).

FIG. 2 is another diagram of an example of an environment 200 for providing resources to customers according to the present disclosure. In a number of examples, providing resources to customers can be implemented in a cloud service management system (e.g., HP Cloud Service Automation (CSA 3.2), for instance). The cloud service management system can orchestrate the deployment of compute and infrastructure resources and complex multi-tier application architectures or any other cloud service described by a blueprint and/or service design. In a number of examples, the cloud service management system can include a catalog-based subscription process. For instance, a subscriber can request particular cloud service offerings to be implemented in a cloud service. In some examples, a subscriber can modify predefined cloud service offerings, wherein the predefined cloud service offerings include pricing and other customer-specific features.

As shown in FIG. 2, a cloud service management system 200 can include a number of different architectural components. For instance, the cloud service management system can include a cloud service management portal 228, a cloud subscriber portal 230, a cloud delivery portal 232, a process engine module 234, and a number of application management modules 236.

The cloud service management portal 228 can include hardware and/or a combination of hardware and programming to perform a number of different functions to manage cloud services. For instance, the cloud service management console 228 can perform administrative functions using an administration module 228-1, design functions using a design module 228-2, and/or management functions using a catalog and service management module 228-3. In some examples, registration can be performed by the resource supply sub-module 232-3 and lifecycle management of resource providers and/or instantiated resources can be performed by a subscription management module associated with the view and operate sub-module 230-4. For example, when resource providers and/or instantiated resources are instantiated, the resource providers and/or instantiated resources can be registered via the resource supply sub-module 232-3 and/or managed via the subscription management module associated with the view and operate sub-module 230-4.

The cloud subscriber portal 230 can include hardware and/or a combination of hardware and programming to perform a number of different functions supporting a cloud subscriber. For example, the cloud subscriber portal can perform functions allowing a cloud subscriber to browse a cloud service catalog (e.g., using a catalog browsing module 230-1), order cloud services (e.g., using an ordering module 230-2), approve cloud service offerings (e.g., using an approval module 230-3), and/or view subscriptions (e.g., using a view and operate module 230-4).

The cloud delivery platform 232 can include hardware and/or a combination of hardware and programming to perform a number of different functions to deliver cloud services. For instance, the cloud delivery platform 232 can include a service consumption sub-module 232-1 including information on cloud service pricing, a catalog of cloud services available, a number of offerings, and/or subscriptions to cloud services. Similarly, the cloud service delivery platform 232 can include a service delivery sub-module 232-2 that can include information on service blueprints, cloud service components, instances, and/or bindings. Further, the cloud service delivery platform 232 can include a resource supply sub-module 232-3 that can include information on resource pools, cloud service providers, cloud service offerings, and/or cloud service subscriptions. In some examples, relationships between resource providers and/or instantiated resources can be captured. The relationships between the resource providers and/or the instantiated resources can be captured by the resource supply sub-module 232-3 and can be exposed in design module 228-2.

In a number of examples, the cloud management system 200 can include a process engine 234. The process engine 234 can include hardware and/or a combination of hardware and programming to orchestrate cloud service management operations (e.g., using an operations orchestration module). Further, the cloud management system 200 can include an application management system 236. The application management system 236 can include hardware and/or a combination of hardware and programming to manage applications.

In examples of the present disclosure, upon deployment of the new service offering, the resource providers and/or the instantiated resources can be partitioned to create resources that can be used by the new service offering, as discussed herein. The instantiated resources associated with the new service offering can be registered and/or managed with the resource provider associated with the node-relationship model used to construct the deployment plan. In some examples, registration can be performed by the resource supply sub-module 232-3 and/or lifecycle management of the instantiated resources can be implemented by the subscription management module associated with the view and operate sub-module 230-4.

As discussed herein, registration of the instantiated resources can be performed with the resource supply sub-module 232-3. When lifecycle management of services associated with the instantiated resources takes place via the subscription management module associated with the view and operate sub-module 230-4, the instantiated resources may also have their lifecycle managed and their registered status updated.

Figure 3:
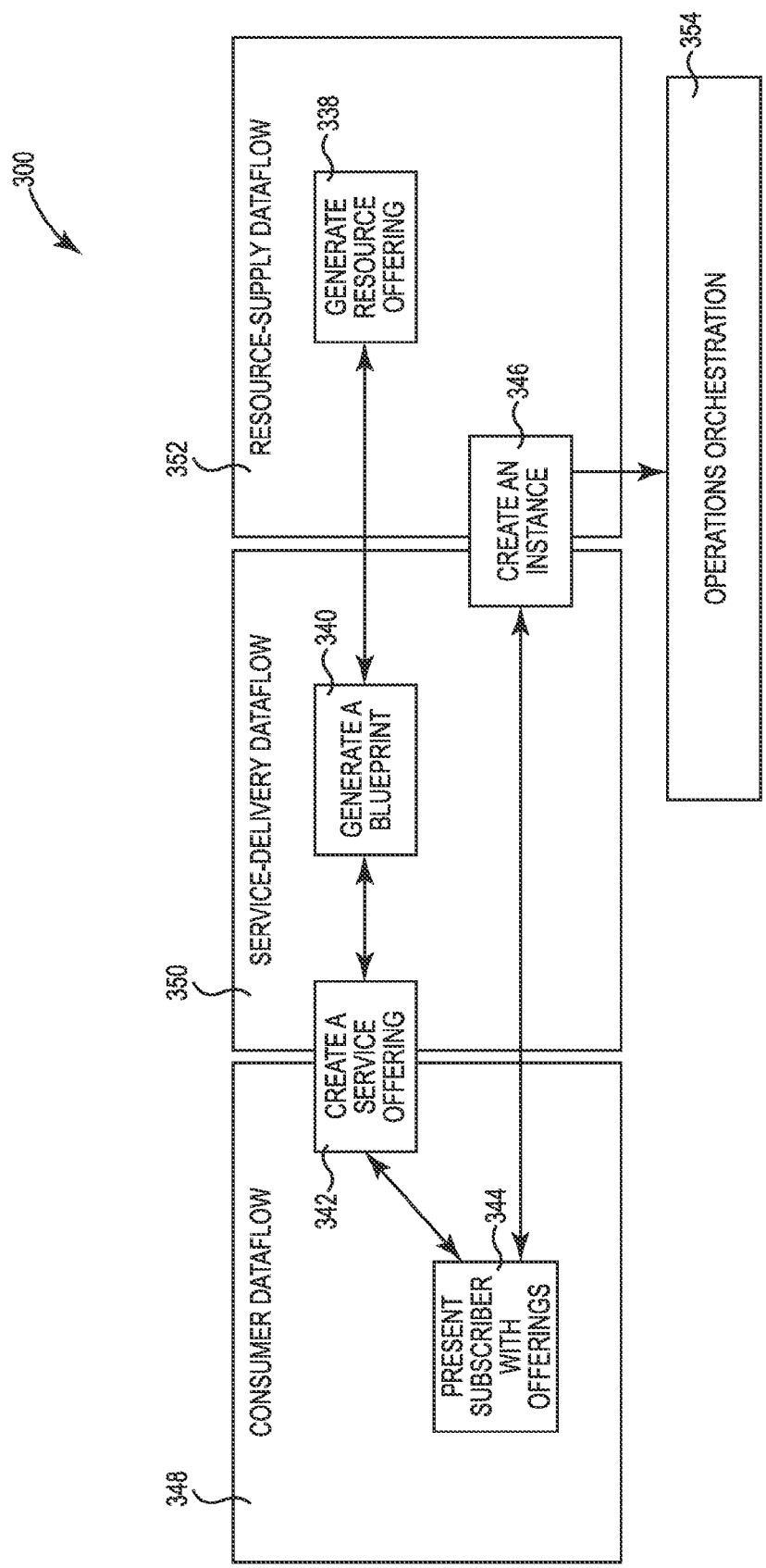
FIG. 3 illustrates a flow chart for providing resources to customers according to the present disclosure.

FIG. 3 illustrates a flow chart for providing resources to customers according to the present disclosure. As shown in FIG. 3, a cloud service management system 300 can manage the flow of information between a subscriber (e.g., via a consumer dataflow 348), a cloud service (e.g., via a service-delivery dataflow 350), and resource providers (e.g., via a resource-supply dataflow 352). For example, at 338, the cloud service management system 300 can generate a resource offering. Generating a resource offering can include creating and/or importing resource offerings from underlying resource providers. At 340, the cloud service management system 300 can generate a service blueprint. Generating a service blueprint can include designing a cloud service, including the configuration, topology, behaviors, resource bindings, and/or service options included in the cloud service. At 342, the cloud service management system 300 can create a service offering. Creating a service offering can include defining pricing for the particular cloud service, defining a number of options related to the cloud service, defining default options related to the cloud service, and/or defining SLA documents related to the cloud service, for instance. In some examples, step 580 of FIG. 5 can be implemented by component 342.

At 344, the cloud service management system 300 can present a subscriber with service offerings for review, approval, and subscription. At 346, the cloud service management system 300 can create an instance of the particular service offerings. Creating an instance of the particular service offerings can include selecting a service component, binding a resource to provide the cloud service, and/or generating a resource subscription. In a number of examples, the instance of the particular service offering and/or the resource subscription for the particular service offerings can be sent to an operations orchestrator 354 for implementation. In some examples, step 578 of FIG. 5 can be implemented by component 338, component 340, and/or component 346.

Figure 4A:
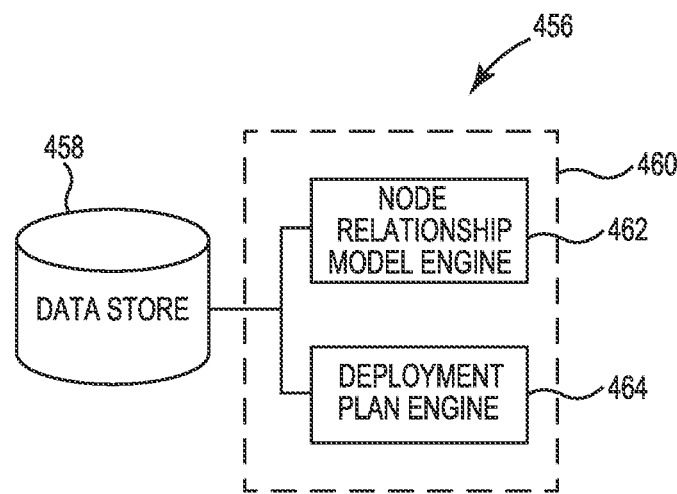
FIG. 4A illustrates a block diagram of an example of a computing device according to the present disclosure.

FIG. 4A illustrates a diagram of an example of a system 456 for providing resources to customers according to the present disclosure. The system 456 can include a data store 458, a providing system 460, and/or a number of engines. The system 456 can be in communication with the data store 458. In some examples, the providing system 456 can include a number of engines (e.g., node-relationship model engine 462, deployment plan engine 464, etc.). The providing system 460 can include additional or fewer engines than illustrated to perform the various functions.

The node relationship model engine 462 can include hardware and/or a combination of hardware and programming to provide a plurality of node-relationship models based on a plurality of realized service offerings for a plurality of customers. In some examples, the node-relationship model can include an instantiated first resource provided by a resource provider; an instantiated second resource provided by the instantiated first resource; and a plurality of defined relationships among the resource provider, the instantiated resource, and the recursive resource.

The instantiated first resource can be partitioned to create the instantiated first resource and the instantiated second resource. That is, the number of instantiated resources that an instantiated first resource uses can be partitioned such that a first portion of the number of instantiated resources are used by the instantiated first resource and a second portion of the number of instantiated resources are used by the second instantiated resource. In a number of examples, the resource provider can partition the instantiated first resource.

The deployment plan engine 464 can include hardware and/or a combination of hardware and programming to provide a deployment plan for a new service offering for a particular customer based on a similarity of a desired service of the particular customer to one of the plurality of realized service offerings. In some examples, the deployment plan engine can execute instructions associated with the deployment plan to provision resources (e.g., resource providers, instantiated resources) and/or perform other lifecycle management functions, which can include creating instantiated resources, retiring instantiated resources, creating more instantiated resources, and/or creating less instantiated resources.

The particular customer can specify a desired service to be provided by a service offering. The customer can specify constraints such as a particular QoS parameter, business policy parameter, data center constraints parameter, and/or SLA parameter for a desired service. The constraints associated with the desired service can be compared to constraints associated with realized service offerings and/or associated node-relationship models. In some examples, the realized service offering can be an implementation of a node relationship model and nodes can include the instantiated resources, resource providers, and relationships between the instantiated resources and resource providers.

In some examples, the deployment plan can be created by applying the node-relationship model to the new service offering. As discussed herein, the node-relationship model can include the instantiated resources, resource provider, and relationships between the instantiated resources and resource provider. The node-relationship model can therefore be used as a topological map to construct the new service offering in a way that complies with a customer's desired service. For example, based on the topology of the node-relationship model, the deployment plan can be created for the new service offering. The resource provider that created the realized service offering for an original customer and/or plurality of customers can construct the new service offering based on the deployment plan. For example, a portion of the resource provider and/or instantiated resources can be partitioned to create the new service offering.

In examples of the present disclosure, the instantiated resources can be partitioned to create resources that can be used by the new service offering, as discussed herein. The instantiated resources associated with the new service offering can be registered and/or managed with the resource provider associated with the node-relationship model used to construct the deployment plan. In addition, the instantiated resources associated with the new service offering can be tracked by the resource provider. For example, tracking can include tracking a status of the instantiated resources, dependencies associated with the instantiated resources, locations of the instantiated resources, relationships associated with the instantiated resources, etc.

Upon registration of the instantiated resources, the service associated with the instantiated resource can be managed (e.g., via subscription management) by the user, for example. The instantiated resource associated with the service can then be impacted via the resource provider managing the instantiated resource. In some examples, managing the lifecycles of the services that may impact the used instantiated resources may include creating instantiated resources, retiring instantiated resources, creating more instantiated resources, and/or creating less instantiated resources.

The deployment plan engine 464 can create a plurality of deployment plans for a plurality of new service offerings for a plurality of different customers. In some examples, the plurality of deployment plans for the plurality of new service offerings can be based on a similarity of a desired service of each of the plurality of different customers to one of the plurality of realized service offerings and/or node-relationship models. As discussed herein, each customer can provide constraints, for example, a particular QoS parameter, business policy parameter, data center constraints parameter, and/or SLA parameter and the constraints can be compared to constraints associated with realized service offerings and/or node-relationship models. Based on the comparison, a node-relationship model, which can be associated with a realized service offering, can be chosen to provide the deployment plan for the new service offering.

The deployment plan engine 464 can allow the particular customer to perform an end to end transaction. In some examples, the end to end transaction can include instantiating a server with a particular network address. In some examples, the end to end transaction can include instantiating a server with a particular operating system. In some examples, the end to end transaction can include instantiating processing and memory resources.

Figure 4B:
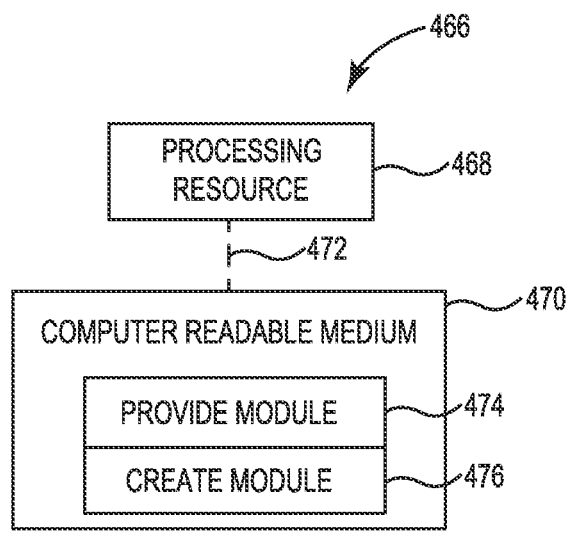
FIG. 4B illustrates a block diagram of an example of a system for providing resources according to the present disclosure.

FIG. 4B illustrates a diagram of an example of a computing device for providing resources to customers according to the present disclosure. The computing device 466 can utilize software, hardware, firmware, and/or logic to perform a number of functions described herein.

The computing device 466 can be a combination of hardware and instructions to share information. The hardware, for example can include a processing resource 468 and/or a memory resource 470 (e.g., computer-readable medium (CRM), database, etc.). A processing resource 468, as used herein, can include a number of processors capable of executing instructions stored by a memory resource 470. Processing resource 468 can be integrated in a single device or distributed across multiple devices. The instructions (e.g., computer-readable instructions (CRI)) can include instructions stored on the memory resource 470 and executable by the processing resource 468 to implement a particular function (e.g., providing resources to customers, etc.).

The memory resource 470 can be in communication with the processing resource 468. A memory resource 470, as used herein, can include a number of memory components capable of storing instructions that can be executed by processing resource 468. Such a memory resource 470 can be a non-transitory CRM. The memory resource 470 can be integrated in a single device or distributed across multiple devices. Further, the memory resource 470 can be fully or partially integrated in the same device as the processing resource 468 or it can be separate but accessible to that device and the processing resource 468. Thus, it is noted that the computing device 470 can be implemented on a user device and/or a collection of user devices, on a mobile device and/or a collection of mobile devices, and/or on a combination of the user devices and the mobile devices.

The memory resource 470 can be in communication with the processing resource 468 via a communication link 472 (e.g., path). The communication link 472 can be local or remote to a computing device associated with the processing resource 468. Examples of a local communication link 472 can include an electronic bus internal to a computing device where the memory resource 470 is one of a volatile, non-volatile, fixed, and/or removable storage medium in communication with the processing resource 468 via the electronic bus.

The memory resource 470 can include a number of modules such as a provide module 474 and a create module 476. The number of modules 474, 476 can include CRI that when executed by the processing resource 468 can perform a number of functions. The number of modules 474, 476 can be sub-modules of other modules. For example, the provide module 474 and the create module 476 can be sub-modules and/or contained within the same computing device. In another example, the number of modules 474, 476 can comprise individual modules at separate and distinct locations (e.g., CRM, etc.).

Each of the number of modules 474, 476 can include instructions that when executed by the processing resource 468 can function as a corresponding engine as described herein. In another example, the provide module 474 can include instructions that when executed by the processing resource 468 can function as the node relationship engine 462. For example, the provide module 474 can include CRI that when executed by the processing resource 468 can provide a node relationship model based on a realized service offering.

Figure 5:
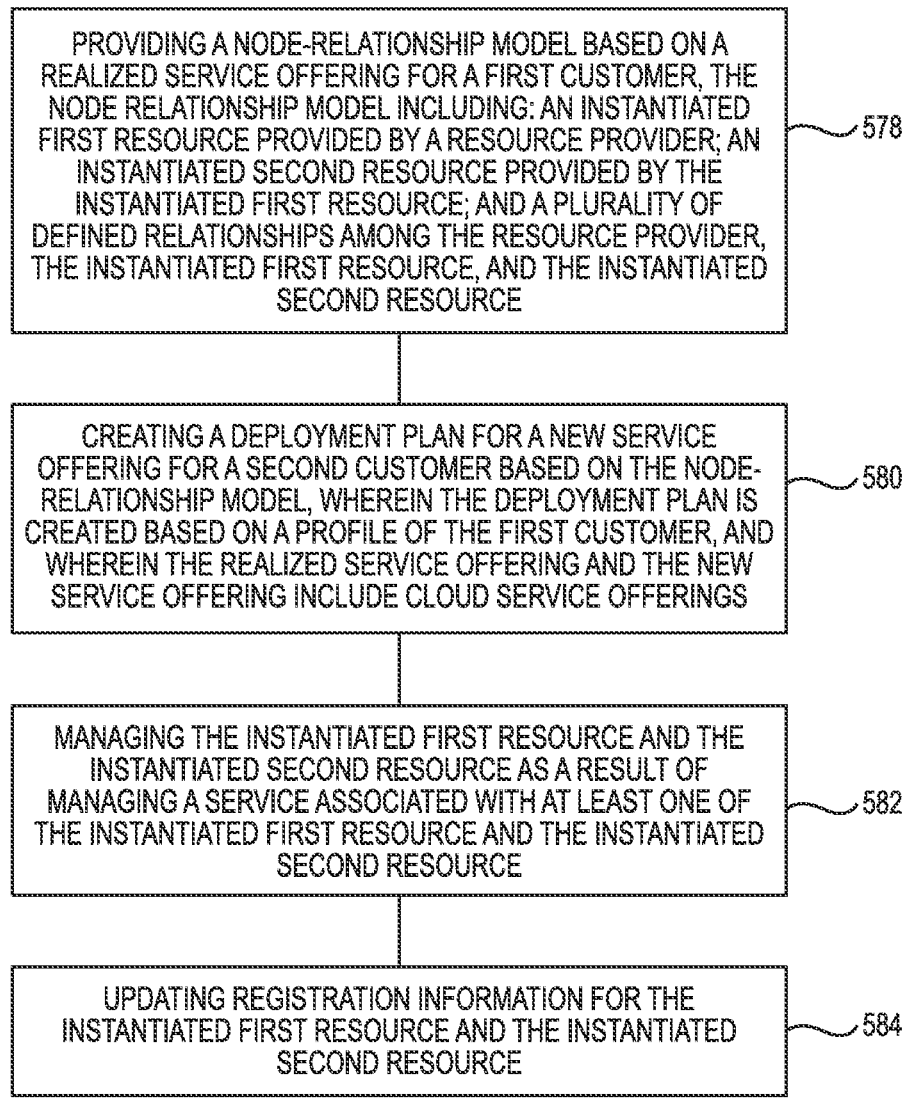
FIG. 5 illustrates a flow diagram of an example of a method for providing resources according to the present disclosure.

FIG. 5 illustrates a flow diagram of an example of a method for providing resources according to the present disclosure. The method can include providing 578 a node-relationship model based on a realized service offering. The node relationship model can include an instantiated first resource provided by a resource provider. In some examples, a customer can request a first number of resources from a resource provider. The resource provider can be a physical provider and/or a logical provider that creates, organizes, or reserves an instantiated resource for an application's, e.g., a consumer's, use. The resource provider can identify a number of resource offerings that a customer can invoke in an instantiated first resource. Resource offerings are capabilities that are associated with an instantiated first resource.

The node relationship model can include an instantiated second resource provided by the instantiated first resource. The instantiated first resource can be partitioned to create the instantiated first resource and an instantiated second resource. That is, the number of instantiated resources that an instantiated first resource uses can be partitioned such that a first portion of the number of instantiated resources are used by the instantiated first resource and second portion of the number of instantiated resources are used by the instantiated second resource.

In examples of the present disclosure, the instantiated first resource and/or the instantiated second resource can be registered with the resource provider. For instance, the instantiated first resource can be registered with the resource provider. Upon instantiation of the second resource, the instantiated first resource can become a resource provider and the instantiated second resource can register with the instantiated first resource (e.g., resource provider). The resource provider can manage the instantiated first resource and/or instantiated second resource, as discussed herein.

The node relationship model can include a plurality of defined relationships among the resource provider, the instantiated first resource, and the instantiated second resource. The plurality of defined relationships can include a location of the instantiated resources in relation to one another. In some examples, the plurality of defined relationships can specify that different resources reside in a same and/or different data center. For example, the instantiated resources may be desirable to have the instantiated resources reside in a same data center. This may be the case when a customer is associated with a particular tier of service such as a tier 1 service, versus a tier 3 service. In some examples, a tier 1 service can consist of a higher service level than a tier 3 service. As such, instantiated resources may be located in a tier 1 data center to provide the requisite service to a customer.

Alternatively, the instantiated resources can be located in data centers in different locations, for example. This may be the case when a QoS of disaster recovery is desired by a customer. A QoS of disaster recovery may specify that multiple (e.g., redundant) instantiated resources should exist in data centers in different locations. For example, where the instantiated resources include an application server and a database, multiple instances of the application server and the database can be instantiated and can be located in geographically separate data centers. As such, if a disaster occurs, while one of the application servers and/or databases may be affected, the rest of the application servers and/or databases may remain unaffected.

The method can include creating 580 a deployment plan for a new service offering based on the node-relationship model, wherein the deployment plan is created based on a profile of a customer. In some examples, a customer profile can include example constraints such as a QoS parameter, business policy parameter, data center constraints parameter, and SLA parameter, although examples are not so limited. Based on the constraints, particular resources can be selected to create the deployment plan that fulfill the constraints included in the customer profile. As discussed herein, a QoS of disaster recovery may specify that resources such as a number of databases and a number of application servers be hosted on servers in different data centers to avoid all of the number of databases and/or the number of application servers being affected as a result of a disaster, for example.

In some examples, the customer profile can be defined by the customer at subscription to a cloud service. For example, the customer can specify constraints (e.g., QoS parameter, business policy parameter, data center constraints parameter, SLA parameter) associated with a service performed on the cloud service. In addition, the profile can be defined by an administrator associated with the cloud service.

The method can include managing 582 the instantiated first resource and the instantiated second resource as a result of managing a service associated with at least one of the instantiated first resource and the instantiated second resource. The service associated with the at least one of the instantiated resources can be managed via the resource provider associated with the node-relationship model used to construct the deployment plan. As a result, the instantiated resources associated with the service can then be impacted via the resource provider. In addition, the instantiated resources associated with the new service offering can be tracked by the resource provider. Tracking can include tracking a status of the instantiated resources, dependencies associated with the instantiated resources, locations of the instantiated resources, relationships associated with the instantiated resources, etc.

Upon registration of the instantiated resources, the resource provider can manage lifecycles of services that may impact the used instantiated resources. Managing the lifecycles of the services that may impact the used instantiated resources may include creating instantiated resources, retiring instantiated resources, creating more instantiated resources, and/or creating less instantiated resources.

The method can include updating 584 registration information for the instantiated first resource and the instantiated second resource. In some examples, updating the registration information for the instantiated first resource and the instantiated second resource can include updating a status, availability, etc. for the instantiated resources.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing instructions executable by a computer system to cause the computer system to:
provide a node-relationship model based on a realized service offering, the node-relationship model including information of:
a plurality of instantiated first resources provided by a plurality of resource providers;
a plurality of instantiated second resources provided by the plurality of instantiated first resources; and
a plurality of defined relationships among the plurality of resource providers, the plurality of instantiated first resources, and the plurality of instantiated second resources;
create a deployment plan for a new service offering based on the node-relationship model;
execute instructions associated with the deployment plan to provision resources to deploy the new service offering; and
as part of the provisioning of the resources to deploy the new service offering, partition an instantiated first resource of the plurality of instantiated first resources and an instantiated second resource of the plurality of instantiated second resources to create the resources to deploy the new service offering.

2. The non-transitory computer-readable medium of claim 1, wherein:
the realized service offering comprises a realized service offering for a first customer;
the deployment plan for the new service offering comprises a deployment plan for a second customer; and
wherein a provisioned resource associated with the deployment plan for the second customer is registered and tracked by a resource provider.

3. The non-transitory computer-readable medium of claim 1, wherein the plurality of defined relationships include a part-of dependency from an instantiated second resource to an instantiated first resource.

4. The non-transitory computer-readable medium of claim 1, wherein the plurality of defined relationships include a use-of dependency from an instantiated second resource to an instantiated first resource.

5. The non-transitory computer-readable medium of claim 1, wherein the realized service offering and the new service offering comprise cloud service offerings.

6. The non-transitory computer-readable medium of claim 1, wherein the instantiated first resource provided by a resource provider is selected from among a network resource, a computer resource, and a storage resource.

7. The non-transitory computer-readable medium of claim 1, wherein creating the deployment plan is based on comparing the realized service offering associated with the node-relationship model with a service requested by a customer.

8. The non-transitory computer-readable medium of claim 7, wherein the customer comprises an application program.

9. A non-transitory computer-readable medium storing instructions executable by a computer system to cause the computer system to:
provide a node-relationship model based on a realized service offering, the node-relationship model including information of:
an instantiated first resource provided by a resource provider;
an instantiated second resource provided by the instantiated first resource; and
a plurality of defined relationships among the resource provider, the instantiated first resource, and the instantiated second resource;
create a deployment plan for a new service offering based on the node-relationship model;
execute instructions associated with the deployment plan to provision resources to deploy the new service offering;
as part of the provisioning of the resources to deploy the new service offering, partition the instantiated first resource and the instantiated second resource to create the resources to deploy the new service offering;
receive a request from a first customer for a first resource at the resource provider;
provide, by the resource provider, a first reference of the instantiated first resource to the first customer;
receive a request from the first customer for a second resource at the instantiated first resource; and
provide, by the instantiated first resource, a second reference of the instantiated second resource to the first customer.

10. A system comprising:
a processor; and
a non-transitory computer readable medium having instructions executable on the processor to:
provide a plurality of node-relationship models based on a plurality of realized service offerings for a plurality of different customers, wherein a first node-relationship model of the plurality of node-relationship models includes information of:
an instantiated first resource provided by a resource provider;
an instantiated second resource provided by the instantiated first resource; and
a plurality of defined relationships among the resource provider, the instantiated first resource, and the instantiated second resource;
create a plurality of deployment plans for a plurality of new service offerings for the plurality of different customers, each deployment plan of the plurality of deployment plans based on a similarity of a requested service of a respective customer of the plurality of different customers to a respective realized service offering of the plurality of realized service offerings;
execute instructions associated with a given deployment plan of the plurality of deployment plans to provision resources to deploy a given new service offering of the plurality of new service offerings; and
as part of the provisioning of the resources to deploy the given new service offering, partition the instantiated first resource and the instantiated second resource to create the resources to deploy the given new service offering.

11. The system of claim 10, wherein the instructions are executable on the processor to apply the first node-relationship model to the given new service offering using the given deployment plan.

12. The system of claim 10, wherein the instructions are executable on the processor to allow a first customer to perform an end to end transaction.

13. The system of claim 12, wherein the end to end transaction is selected from among:

a transaction instantiating a server with a particular network address;

a transaction instantiating a server with a particular operating system; and a transaction instantiating processing and memory resources.

14. The system of claim 10, wherein the instantiated first resource provided by the resource provider is selected from among a network resource, a computer resource, and a storage resource.

15. A method performed by a system comprising a hardware processor, comprising:

providing a node-relationship model based on a realized service offering for a first customer, the node-relationship model including information of:

an instantiated first resource provided by a resource provider;

an instantiated second resource provided by the instantiated first resource; and a plurality of defined relationships among the resource provider, the instantiated first resource, and the instantiated second resource;

creating a deployment plan for a new service offering for a second customer based on the node-relationship model, wherein the deployment plan is created based on a profile of the first customer, and wherein the realized service offering and the new service offering include cloud service offerings;

executing instructions associated with the deployment plan to provision resources to deploy the new service offering; and as part of the provisioning of the resources to deploy the new service offering, partitioning the instantiated first resource and the instantiated second resource to create the resources to deploy the new service offering;

managing the instantiated first resource and the instantiated second resource as a result of managing a service associated with at least one of the instantiated first resource and the instantiated second resource; and updating registration information for the instantiated first resource and the instantiated second resource.

16. The method of claim 15, wherein the profile includes constraints associated with at least one of a quality of service, a service level agreement, or a data center constraint.

17. The method of claim 15, wherein the profile is defined by the first customer as part of a subscription to a cloud service.

18. The method of claim 15, wherein the instantiated first resource provided by the resource provider is selected from among a network resource, a computer resource, and a storage resource.

* * * * *